United States Patent Office.

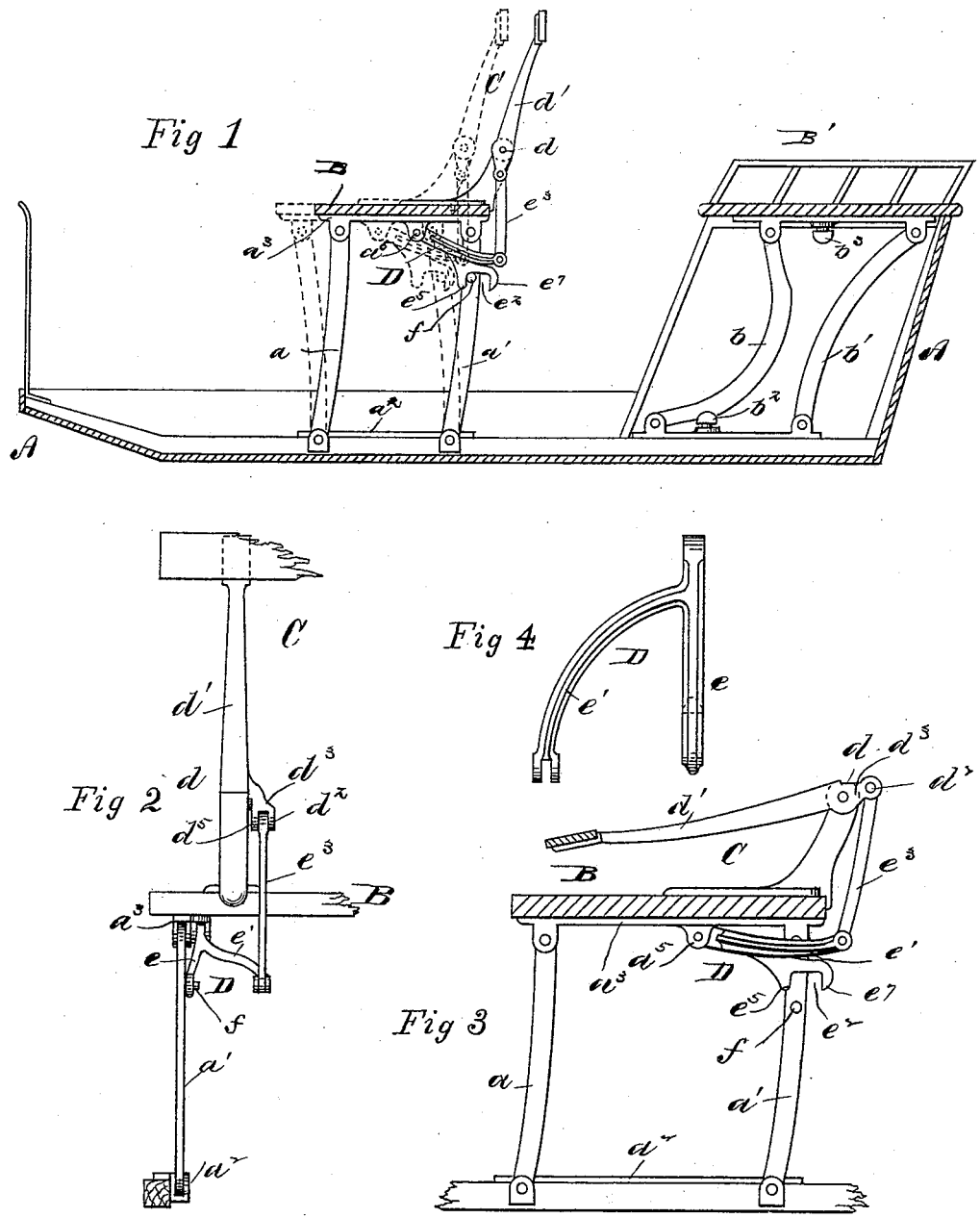

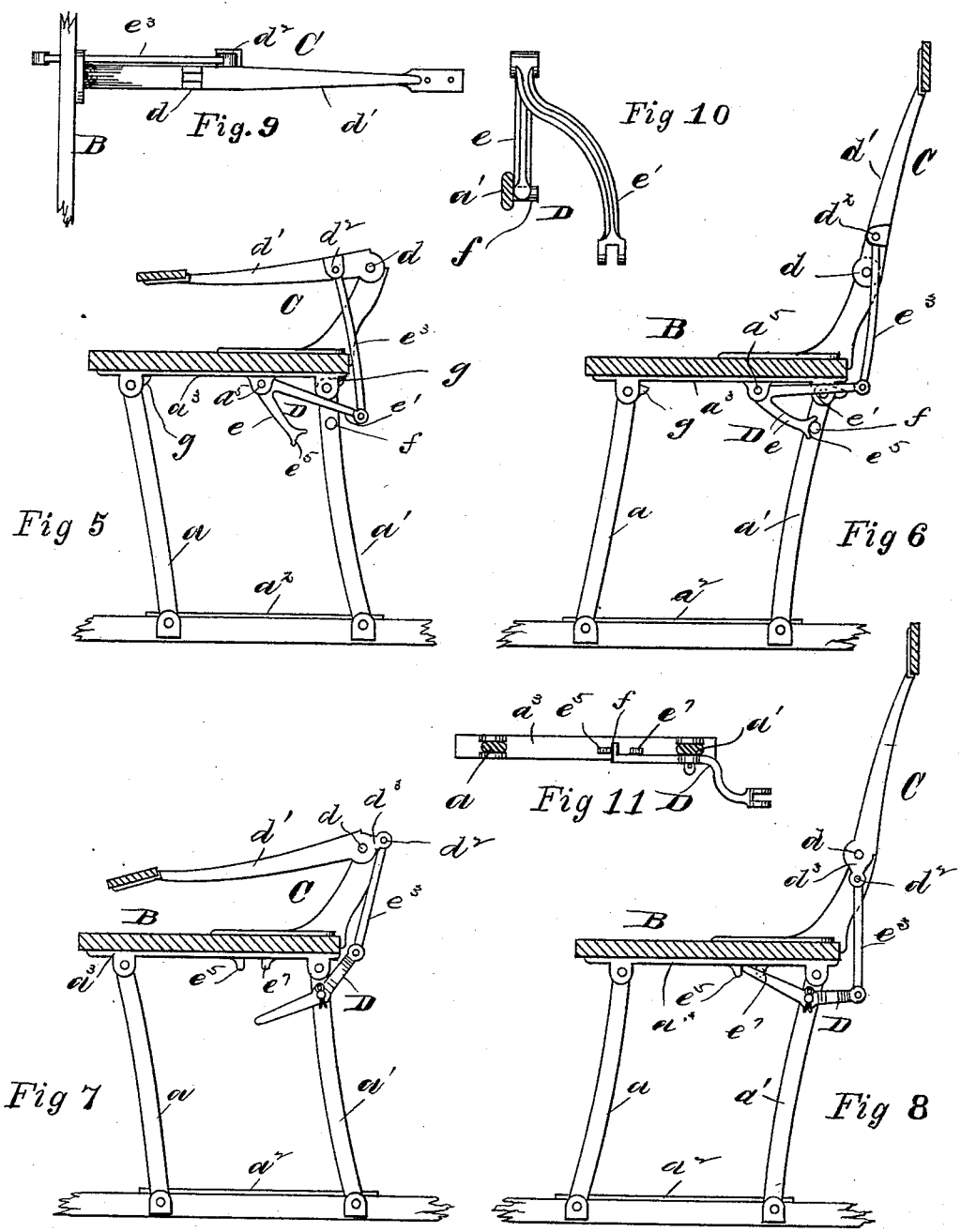

FRANK RIGHTMYER, OF SPRINGFIELD, OHIO, ASSIGNOR OF ONE-HALF TO CHARLES C. ADELSPERGER, OF SAME PLACE.

SHIFTING SEAT FOR VEHICLES.

SPECIFICATION forming part of Letters Patent No. 405,224, dated June 11, 1889.

Application filed November 26, 1888. Serial No. 291,898. (No model.)

*To all whom it may concern:*

Be it known that I, FRANK RIGHTMYER, a citizen of the United States, residing at Springfield, in the county of Clark and State of Ohio, have invented certain new and useful Improvements in Shifting Seats for Vehicles, of which the following is a specification.

My invention relates to improvements in shifting seats for vehicles.

The object of my invention is to provide a simple and effectual locking device for shifting seats adapted to be operated from the lazy-back, the locking device being connected directly to the lazy-back, so as to be moved positively therefrom.

My invention consists in the various constructions and combinations of parts hereinafter described, and pointed out in the claims.

In the accompanying drawings, which form a part of this specification, Figure 1 is a longitudinal sectional elevation view of a portion of a vehicle, showing my improvement in shifting seats attached thereto. Fig. 2 is a rear elevation view of a portion of a seat, showing the locking device and the method of connecting the same to the lazy-back. Fig. 3 is a side elevation view of the same. Fig. 4 is a detail view of a portion of the locking device. Figs. 5 and 6 are sectional elevation views showing modified forms of the locking device in different positions of adjustment. Figs. 7 and 8 are similar views of a modified form of locking device. Figs. 9, 10, and 11 are detail views of some of the various parts of the locking device, which will be readily understood from the further description herein.

Like parts are indicated by similar letters of reference throughout the several views.

In the said drawings, A A represent the vehicle-body; B B', the seats thereof. The seats B B' are supported from the vehicle-body by supporting-legs $a\ a'\ b\ b'$. The supporting-legs $b\ b'$ of the rear seat B' are of a well-known construction adapted to permit of a forward or backward movement of the said seat, so that the same shall occupy a position at the rear of the vehicle-body or near the center thereof, as may be desired, the leg $b'$ being so constructed as to rest against bearings $b^2$ and $b^3$ in either position of adjustment in a well-known manner.

The front seat B is supported on legs $a\ a'$, which are pivoted at the bottom to a sill-plate $a^2$ and at the top to a seat-plate $a^3$ in such a manner as to fold backwardly and occupy a space under the rear seat when said rear seat is moved to a forward position and adapted to be supported in an upright position when the rear seat is turned backwardly to the rear of the vehicle.

In order to provide means for holding the front seat B in an upright position when a two-seated vehicle is desired and to permit the same to be folded when a one-seated vehicle is desired, I provide a locking device of novel construction, adapted to accomplish its object in the following manner: The front seat B is provided with a hinged back C, commonly known as a "lazy-back." This back C is hinged at $d$, to permit the same to be turned down, as shown in Fig. 3, when the seat is to be folded. The seat-plate $a^3$ is provided at a point between the points of connection for the legs $a\ a'$ with ears or lugs $a^5$, to which is pivoted the end of a Y-shaped lever D. This lever D is formed at one side with a straight projecting arm $e$ and at the other with a curved projecting arm $e'$.

The arm $e$ is provided with a notch or opening $e^2$, adapted to receive a projection $f$ on the leg $a'$, which supports the seat. The outer curved arm $e'$ of the pivoted lever D is attached by a connecting-rod $e^3$ to the upper portion $d'$ of the lazy-back C at a point $d^2$ removed from the center $d$ of oscillation of said lazy-back. This point $d^2$ is preferably placed below the pivoted point $d$ of the lazy-back by providing a laterally and downwardly extending arm $d^3$, having a bifurcated portion $e^3$, to which the connecting-arm $d^3$ is attached. By this construction it will be seen that a folding movement of the lazy-back C will cause an upward movement of the outer portion of the pivoted lever D, which will withdraw the notch $e^2$ from over the projection $f$, and thus disengage the leg $a'$ and permit the seat to be folded.

I preferably form the notch $e^2$ considerably larger than the projection $f$, and provide two stop-faces $e^5$ and $e^7$, adapted to hold the seat against either a forward or backward movement, and at the same time permit a limited movement, as indicated by the dotted lines in Fig. 1, to permit the seat to be shifted forward to a slight extent to increase the space between the front and rear seats to permit freer ingress or egress to the rear portion of the vehicle.

It is obvious that the construction herein described may be variously modified. In Figs. 5, 6, 9, and 10 I have shown the arm $e'$ of the pivoted lever D provided with a single stop projection $e^5$, adapted to hold the seat from a backward movement only. When this construction is used, I place a small stop $g$ at the top of the legs $a\,a'$, or either of them, adapted to come against the seat-plate $a^3$ and limit the movement of the seat in a forward direction. I have also shown in these figures the connecting-rod $e^3$ attached above the pivotal point $d$ of the lazy-back, so that the folding movement of the lazy-back produces a downward movement of the pivoted lever D, instead of an upward movement, as shown in Figs. 1 to 4, inclusive.

In Figs. 7, 8, and 11 I have shown the pivoted arm D attached to the leg $a'$ and provided with a stop projecting portion $f$, adapted to bear against the stop projections $e^5$ and $e^7$, which in this case are located on the seat-plate $a^3$. In this case the point $d^2$, at which the connecting-arm $e^3$ is attached to the lazy-back C, is below the pivotal point $d$.

The stops $e^5$ and $e^7$ in this case hold the seat in either direction, and may be located at a sufficient distance from each other to permit a limited forward movement of the front seat, as before described.

It will be seen that from the above construction a simple and cheap locking device is secured, which is at the same time very effective in its operation. Being connected directly to the moving portion of the lazy-back without any intermediate mechanism other than the connecting-rod $e^3$, the movement of said locking device is positive and cannot fail to operate when the lazy-back is turned in either position of adjustment, as described.

Having described my invention, I claim—

1. The combination, with a seat for vehicles, supported on pivoted legs and adapted to fold, as described, of a pivoted locking-arm connected to one of the moving parts of said seat and a stop projection on one of the other moving parts, a hinged lazy-back on said seat, and a direct connection from the hinged portion of said lazy-back to the pivoted arm, substantially as and for the purpose set forth.

2. The combination, with a folding seat supported on pivoted legs, as described, of a locking-arm pivoted to said seat and provided with a stop projection, a lug or projection on one of the legs adapted to engage with said stop projection, a hinged lazy-back on said seat, and a connecting-arm adapted to form a direct connection between the hinged portion of said lazy-back and the pivoted locking-arm, substantially as described.

3. The combination, with a folding seat supported on pivoted legs, as described, of a pivoted locking-lever having the straight arm $e$ and the laterally-curved arm $e'$, a stop projection on the said straight arm adapted to come in contact with a projection on one of the supporting-legs, a hinged lazy-back on the said seat, provided with a laterally and downwardly extending arm, which passes below the pivoted point thereof, and a connecting-rod from the said arm to the curved arm $e'$ of said pivoted lever, substantially as specified.

4. The combination, with a folding seat pivoted on supporting-legs, as described, of a pivoted locking-lever connected to said seat and adapted to engage with a stop projection on one of said legs and hold the said seat against movement in one direction, a hinged lazy-back on said seat, a connecting-arm attached to the hinged portion of said lazy-back at a point removed from the pivotal center thereof and at the other end to the pivoted locking-lever, and a positive stop for said seat in the other direction, substantially as specified.

5. The combination, with a folding seat supported on pivoted legs, as described, of a locking-arm D, pivoted to said seat and provided with a projecting arm $e$, having a stop projection $e^5$, a curved arm $e'$, a connecting-rod $e^3$, a lazy-back having a hinged portion $d'$, and an extending arm $d^3$, said connecting-arm being connected to said arm $d^3$, substantially as and for the purpose set forth.

In testimony whereof I have hereunto set my hand this 21st day of November, A. D. 1888.

FRANK RIGHTMYER.

Witnesses:
 CHAS. S. WELCH,
 JOSHUA SCOTT.